United States Patent [19]

Hoshino et al.

[11] Patent Number: 4,490,763

[45] Date of Patent: Dec. 25, 1984

[54] TAPE CASSETTE

[75] Inventors: Mitsuo Hoshino, Kasukabe; Takashi Yamamoto, Yokohama, both of Japan

[73] Assignee: Sony Corporation, Tokyo, Japan

[21] Appl. No.: 355,238

[22] Filed: Mar. 5, 1982

[30] Foreign Application Priority Data

Mar. 9, 1981 [JP] Japan ................... 56-32498

[51] Int. Cl.³ .............. G11B 23/02; G11B 5/008; G11B 15/66
[52] U.S. Cl. ................... 360/132; 360/93
[58] Field of Search ............ 360/132, 134, 93, 95, 360/96; 242/197, 199

[56] References Cited

U.S. PATENT DOCUMENTS

| | | | |
|---|---|---|---|
| 4,044,390 | 8/1977 | Yamashita | 360/137 |
| 4,107,753 | 8/1978 | Izumikawa | 360/93 |
| 4,130,848 | 12/1978 | Amano | 360/93 |
| 4,308,562 | 12/1981 | Negishi | 360/93 |
| 4,380,032 | 4/1983 | Pfost | 360/132 |

*Primary Examiner*—Robert Martin Kilgore
*Attorney, Agent, or Firm*—Hill, Van Santen, Steadman & Simpson

[57] ABSTRACT

A tape cassette for a magnetic recording and/or reproducing apparatus has at least one reel contained in a housing formed with an opening through which a tape wound on a reel can be withdrawn from the cassette housing for recording of signals thereon or reproducing the signals therefrom, and a lid is provided to move between a closed position covering the housing opening and an opened position exposing the housing opening. The lid is pivoted on the housing by means of a pair of pins which are formed on ear portions directed rearwardly from opposite ends of the lid and a pair of arcuated grooves receiving the pair of pins, respectively, and which are formed on side walls of the housing.

4 Claims, 9 Drawing Figures

FIG.IA
*PRIOR ART*
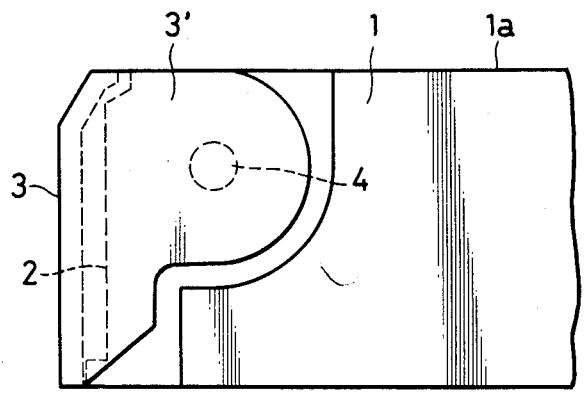
FIG.IB
*PRIOR ART*
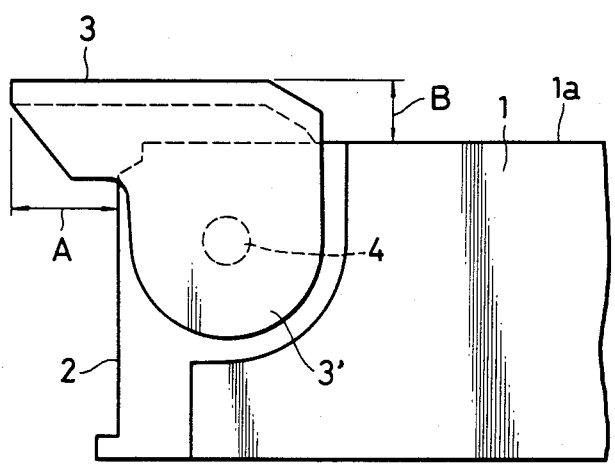

TAPE CASSETTE

BACKGROUND OF THE INVENTION

The present invention relates generally to a tape cassette for magnetic recording and/or reproducing apparatus such as video tape recorder or various other data processing devices and more particularly is directed to a tape cassette having a lid which is movable between a closed position covering an opening formed on front side of the cassette and an opened position exposing the opening.

FIGS. 1A and 1B show a convenntional tape cassette for a video tape recorder. An opening 2 is formed on front side surface of a tape cassette 1. The cassette is provided with a lid 3 which includes ear portions 3' directed rearwardly from the opposite ends of front portion thereof. The ear portions 3' of the lid 3 are formed with inwardly directed pins 4 engageable in respective apertures or recesses in wall end portions of side walls of cassette housing so as to mount the lid 3 pivotally on the cassette housing for movement between a closed position covering the housing opening 2, as shown in FIG. 1A, and an open position exposing the opening 2, as shown in FIG. 1B.

However, with a structure for rotating the lid 3 about the pins 4, the projecting portion A of the lid 3 which extends from the front end of the tape cassette 1 and projecting portion B which extends from the upper end of the tape cassette 1 become relatively large when the lid 3 is rotated from the closed position to the opened position. For loading the tape cassette 1 of this type into the video tape recorder, free pace for the projecting portions A and B must be formed on the main body side of the video tape recorder, thus lowering the space factor of the main body. Thus, a compact video tape recorder cannot be manufactured owing to a low space factor.

SUMMARY OF THE INVENTION

Accordingly, an object of this invention is to provide a tape cassette free from the above described disadvantages.

Another object of the invention is to provide a tape cassette in which the projecting portions of the lid which extend from the front and upper sides of the cassette housing in its closed position can be extremely reduced.

In accordance with an aspect of this invention, a tape cassette comprises a reel having a tape wound thereon, a housing for containing the reel therein and which has an opening permitting the passage of the tape therethrough, and a lid for moving between a closed position covering the opening and an opened position exposing the opening, the lid being pivotally mounted on the cassette housing by means of a pair of pins which are formed on ear portions directed rearwardly from opposite ends of the lid and a pair of arc-shaped grooves receiving the pair of pins, respectively, and which are formed on side walls of the housing.

The above, and other objects, features and advantages of the invention, will be apparent in the following detailed description of illustrative embodiments of the invention which is to be read in connection with the accompanying drawings wherein the same reference numerals are used to identify the same parts in the several views.

BRIEF DESCRIPTION OF THE DRAWINGS

FIGS. 1A and 1B are side views of the main part of a conventional tape cassette;

DETAILED DESCRIPTION OF THE PREFERRED EMBODIMENT

Figure 2:
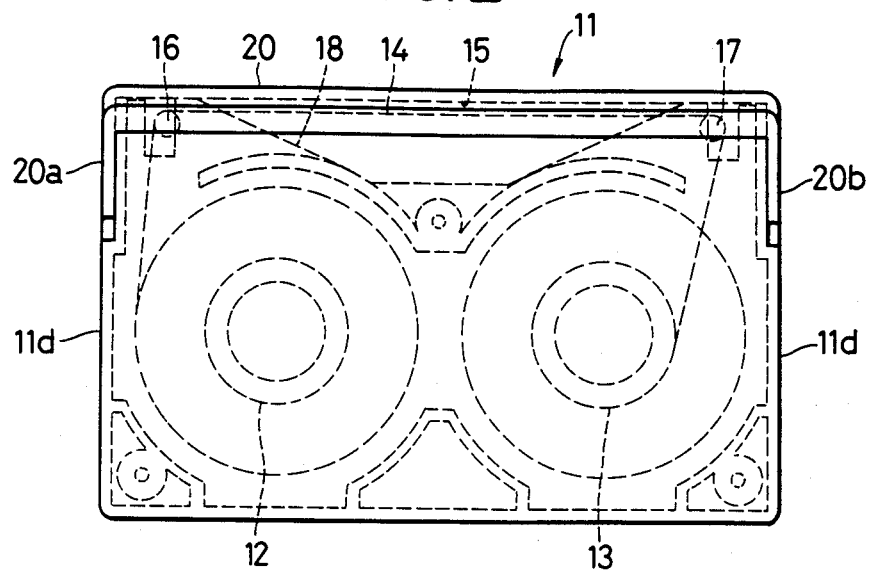
FIG. 2 is a plan view of the overall structure of the tape cassette according to this invention.
Figure 3:
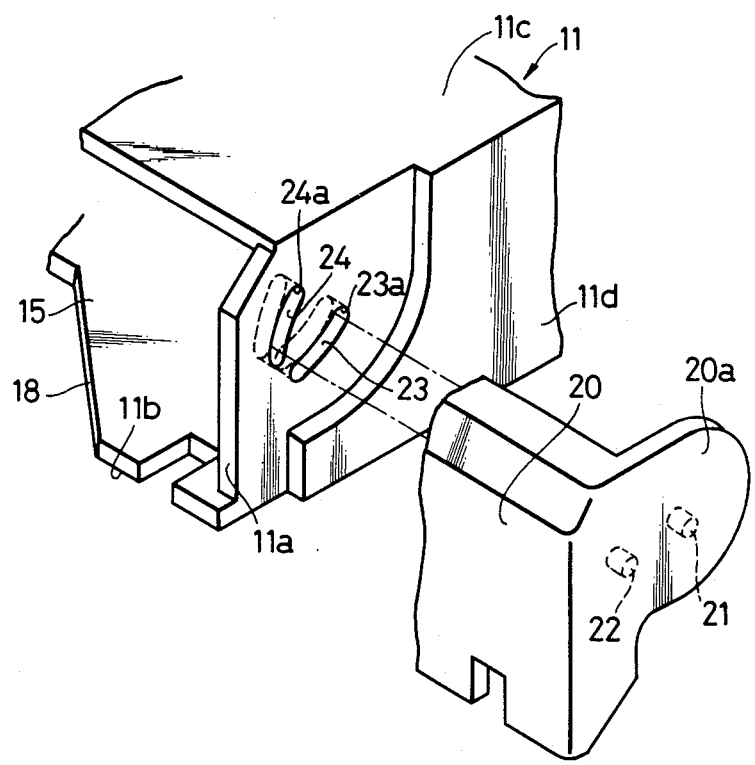
FIG. 3 is an enlarged perspective view of the main part of the tape cassette according to this invention.

A tape cassette according to one embodiment of the present invention will be described with reference to FIGS. 2 to 5B in which the present invention is applied to a tape cassette for a video tape recorder.

A pair of tape reels 12 and 13 are rotatably housed in a tape cassette 11 formed by a synthetic resin. Both ends of a magnetic tape 14 are attached to the tape reels 12 and 13 and the magnetic tape 11 is wound around the tape reels 12 and 13. An opening 15 is formed in a front side surface 11a of the tape cassette 11. The magnetic tape 14 is guided by a pair of guide pins 16 and 17 and extended along the opening 15. A cut-off portion 18 which communicates with the opening 15 is formed in a bottom surface 11b of the tape cassette 11.

The cassette 11 further comprises a lid 20 which is pivoted on the cassette housing and which is adapted, in a closed position, to close or cover the opening 15 of the cassette 11. The lid 20 is shown to include a front portion covering the opening and ears 20a and 20b directed rearwardly from the opposite ends of the front portion to fit into the recesses defined outside of end portions of side walls 11d and thus lie flush with the outer surfaces of such side walls, as shown in FIG. 2.

The ears 20a and 20b at the opposite ends of the lid 20 are formed with a pair of inwardly directed pins 21 and 22 which are engageable in respective arcuated grooves 23 and 24 formed in wall end portions of the side walls 11d of the cassette housing so as to mount the lid 20 for movement between the closed position and the opened position. As specifically shown in FIGS. 4A to 4C, the pair of pins 21 and 22 are mounted on the ear 20a with a predetermined distance a therebetween. On the other hand, the pair of arcuated grooves 23 and 24 are formed with radius b and c, respectively, which are the same length as the distance a. It should be noted that the center of the arcuated groove 24 is selected to be at rearward end of the groove 23 and the center of the arcuated groove 23 at upperward end of the groove 24.

Figure 4A:
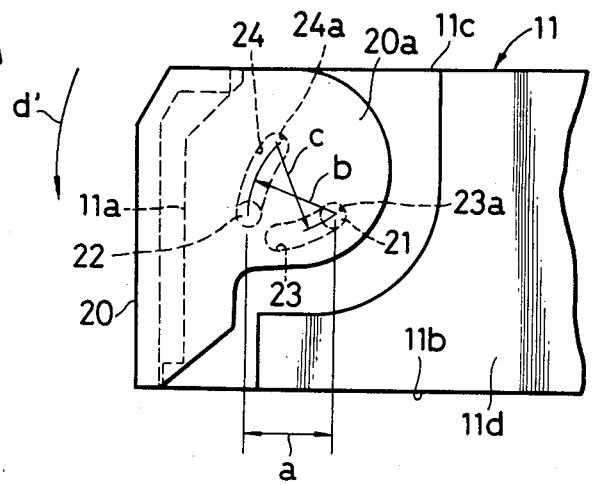
FIGS. 4A to 4C are enlarged side views of the cassette of FIG. 2 for explaining the opening operation of a lid.
Figure 4B:
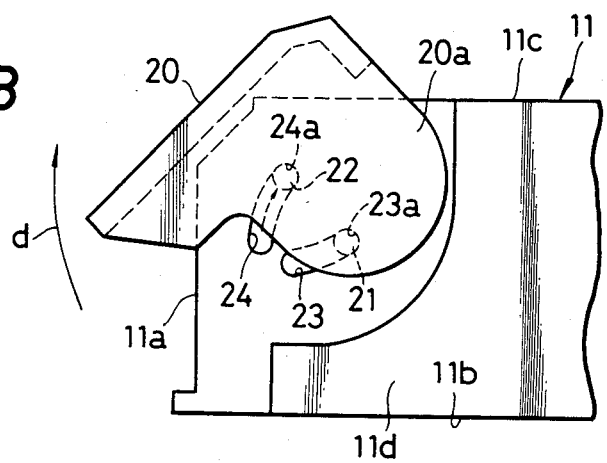
Figure 4C:
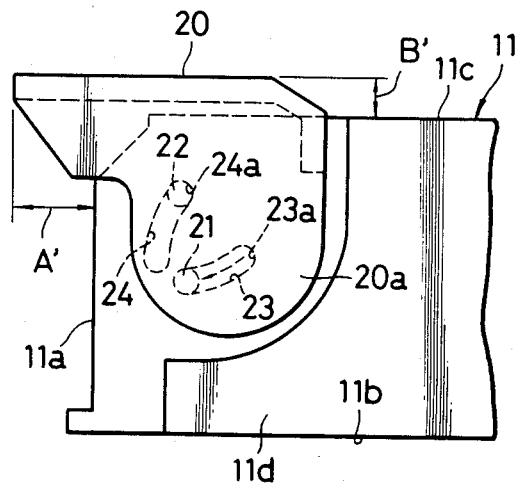

With the tape cassette 11 of the above structure, the lid 20 is urged by a spring 30 or 31 (FIG. 5A or 5B) in the direction indicated by an arrow d' in FIG. 4A and the opening 15 is closed. In this closed position, when the rotating force is applied to the lid 20 in the direction indicated by the arrow d in FIG. 4B against the resilient force of the spring, the lid 20 is rotated about the pin 21 through a certain angle in the direction indicated by the arrow d. On the other hand, the pin 22 is moved within the arcuated groove 24. As shown in FIG. 4B, when the pin 22 comes in contact with the upperward end 24a of the arcuated groove 24 and stops, the lid 20 is then rotated sequentially about the pin 22 in the same direction indicated by the arrow d, as shown in FIG. 4C. Thus, the pin 21 moves within the arcuated groove 23.

In summary, the lid 20 is continuously moved by the weight balance thereof and the frictional force between the arcuated grooves 23 and 24 and the pins 21 and 22 in the direction indicated by the arrow d (upward) while changing the rotating fulcrum from the pin 21 to the pin 22.

According to the lid 20 wherein the fulcrum is sequentially moved from one pin to the other pin, a projecting portion A' of the lid 20 which extends from the front surface of the tape cassette 11 and a projecting portion B' which extends from the upper surface of the tape cassette 11 are greatly decreased as compared with the projecting portions A and B of the conventional tape cassette 11 as shown in FIG. 1B.

Figure 5A:
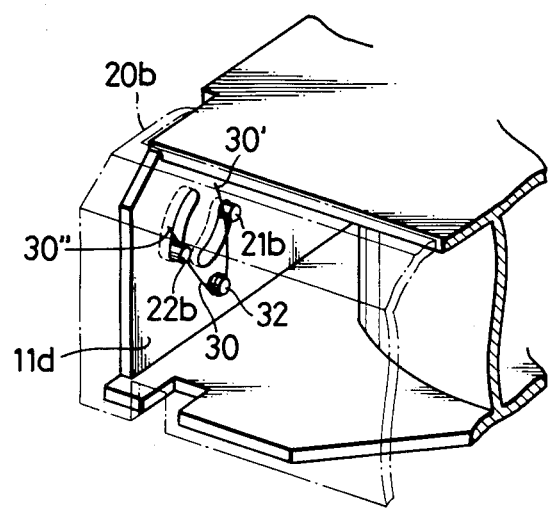
FIGS. 5A and 5B are enlarged perspective views which show a mounting of lid on the cassette.
Figure 5B:
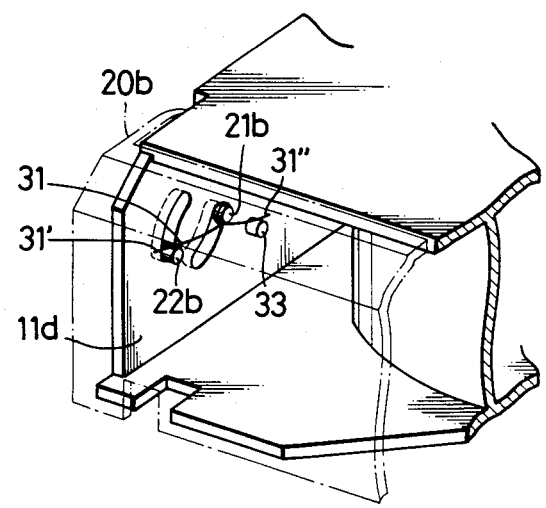

As shown in FIGS. 5A and 5B, springs 30 and 31 are provided so that the lid 20 is biased in the direction indicated in arrow d' (FIG. 4A). Particularly, in FIG. 5A, the coiled spring 30 is mounted on a pin 32 which is formed on inner side of the side wall 11d of the cassette. Free ends 30' and 30" of the coiled spring 30 engage with the pair of pins 21b and 22b from insides thereof and the ends of the spring 30 are urged against the pins 21b and 22b in a direction remote from each other. Accordingly, the lid 20 is normally biased by the spring 30 to its closed position.

On the other hand, in FIG. 5B, the spring 31 is mounted on the pin 21b which is formed the ear portion 20b of the lid 20. Free ends 31' and 31" of the spring 31 respectively engage with the pin 22b and a pin 33 which is formed on inner side of the side wall 11d of the cassette. The end 31' of the spring 31 is urged against the pin 22b in lower direction, so that the lid 20 is also biased by the spring 31 to its closed position.

The present invention is not limited to the particular embodiment described above. The present invention may be applied to a tape cassette for various magnetic recording and/or reproducing apparatus other than the video tape recorder and for various other data processing devices.

In the above embodiment, the two pins 21 and 22 are formed on the side of the lid 20, while the two arcuated grooves 23 and 24 are formed in the tape cassette 11. This arrangement may be reversed. Further, the pin 21 and the arcuated groove 24 may be formed on the side of the lid 20, while the pin 22 and the arcuated groove 23 are formed on the side of the tape cassette 11.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

What is claimed is:

1. A tape cassette comprising:
   a reel having a tape wound thereon,
   a housing for containing said reel therein, said housing having an opening permitting the passage of said tape therethrough;
   a lid pivoted on said housing for movement between a closed position covering said opening and an opened position exposing said opening, a pivotal connection between said lid and said housing comprising a pair of spaced pins and a pair of arcuate grooves receiving said pair of pins,
   the center-to-center spacing between said pins being substantially equal to the radii of curvature of said arcuate grooves, said grooves being positioned and arranged such that as one pin reaches its limit of travel in its associated groove, the second pin beings its travel in its associated groove and upon reaching its limit of travel positions said lid in its opened position.

2. A tape cassette according to claim 1, in which said pair of pins are respectively formed on ear portions which are directed rearwardly from opposite ends of said lid and said pair of arcuate grooves are respectively formed on side walls of said housing.

3. A tape cassette according to claim 1 which includes:
   a third pin fixed to a wall of said housing, and
   a torsion spring coiled on said third pin, the free ends of said torsion spring engaging each of said pair of pins.

4. A tape cassette according to claim 1 which includes:
   a third pin fixed to a wall of said housing, and
   a torsion spring coiled on one of said pair of pins, the free ends of said torsion spring engaging the other pin of said pair, and said third pin, respectively.

* * * * *